United States Patent [19]
Powell

[11] Patent Number: 5,875,338
[45] Date of Patent: Feb. 23, 1999

[54] METHOD AND APPARATUS FOR ARBITRATING RESOURCE REQUESTS UTILIZING INDEPENDENT TOKENS FOR ARBITER CELL SELECTION

[75] Inventor: Lawrence J. Powell, Round Rock, Tex.

[73] Assignee: International Business Machines Corporation, Armonk, N.Y.

[21] Appl. No.: 572,400

[22] Filed: Dec. 14, 1995

[51] Int. Cl.⁶ .................................................. G06F 13/00
[52] U.S. Cl. ......................... 395/728; 395/729; 395/730; 395/732
[58] Field of Search .................................... 395/728, 288, 395/476, 732, 250, 729, 730, 731

[56] References Cited

U.S. PATENT DOCUMENTS

| | | | |
|---|---|---|---|
| 4,363,096 | 12/1982 | Comfort et al. | 364/200 |
| 4,374,413 | 2/1983 | Comfort et al. | 364/200 |
| 4,374,414 | 2/1983 | Comfort et al. | 364/200 |
| 4,560,985 | 12/1985 | Strecker et al. | 340/825.5 |
| 4,638,475 | 1/1987 | Koike | 370/60 |
| 4,811,210 | 3/1989 | McAulay . | |
| 4,933,936 | 6/1990 | Rasmussen et al. . | |
| 5,021,947 | 6/1991 | Campbell et al. . | |
| 5,053,942 | 10/1991 | Srini | 364/200 |
| 5,072,363 | 12/1991 | Gallagher | 395/725 |
| 5,155,854 | 10/1992 | Flynn et al. | 395/725 |
| 5,197,142 | 3/1993 | Williams et al. | 395/425 |
| 5,301,333 | 4/1994 | Lee | 395/725 |
| 5,410,652 | 4/1995 | Leach et al. | 395/250 |
| 5,418,967 | 5/1995 | Simoce et al. | 395/725 |
| 5,491,824 | 2/1996 | Koshi | 395/732 |
| 5,519,837 | 5/1996 | Tran | 395/291 |
| 5,623,672 | 4/1997 | Popat | 395/728 |
| 5,649,206 | 7/1997 | Allen | 395/729 |

*Primary Examiner*—Meng-Ai T. An
*Assistant Examiner*—Eric S. Thlang
*Attorney, Agent, or Firm*—Richard A. Henkler; Andrew J. Dillon

[57] ABSTRACT

According to the present invention, an apparatus for arbitrating between several competing requests that has a number of components cooperate together is disclosed. A number of arbiter cells are provided. These arbiter cells contain a device for shifting a token value, a number of receptors for receiving request signals, and internal circuitry for selecting one of the request signals. The request signal selected by a given arbiter cell depends on the state of the request signals being received by the cell and the position of the cell's token. Also, one or more group arbiters are provided. These group arbiters contain a device for shifting a token value, a number of receptors for receiving request signals, and internal circuitry for selecting an arbiter cell. The arbiter cell eventually selected by a given group arbiter depends on the state of the request signals being received by the arbiter and the position of the arbiter's token. In one mode of operation, each arbiter cell grants a single request signal from the plurality of signals present, and each group arbiter selects a single arbiter cell. This process allows the selection of at least one request signal from the number of request signals originally present.

15 Claims, 4 Drawing Sheets

METHOD AND APPARATUS FOR ARBITRATING RESOURCE REQUESTS UTILIZING INDEPENDENT TOKENS FOR ARBITER CELL SELECTION

BACKGROUND GROUND OF THE INVENTION

1. Technical Field:

The present invention relates generally to arbitration in data processing systems. More specifically, the invention is directed to a method and apparatus that use a pseudo round-robin scheme and independent tokens to arbitrate access to shared system resources in a computer system.

2. Description of the Related Art:

Arbiters, in one form or another, are used in most advanced computer systems. An arbiter manages request from various parts of a data processing system for access to resources that are shared by several elements of the data processing system. For example, in a multi-processor system, several processors may want access to a memory device. If the memory device can handle only one request at a time, a device or method must exist to manage these competing requests. An arbiter's goal is to manage these competing request quickly and efficiently.

The selection of a particular arbiter for a given system is a critical design decision. Due to the arbiter's power in deciding which devices can access certain resources, overall system performance can be greatly enhanced or hindered by the selection of a certain arbiter.

One popular type or arbiter is a fixed-priority arbiter. This type of arbiter is simple to implement, but often, it does not ensure fairness when it comes to allowing access to a given computing device. For instance, a fixed-priority arbiter will often block low priority devices from having access to a shared resource when a high-priority device is constantly demanding access.

One solution to fixed-priority arbiters is a round-robin arbiter. This type arbiter ensures fairness by making sure that all devices eventually gain access to a shared resource. However, round robin arbiters often do not lend themselves to efficient implementation, as they are often slow and/or inefficient.

SUMMARY OF THE INVENTION

It is therefore one of the objectives of this invention to provide for an apparatus and method to quickly and efficiently arbitrate between a number of requests that are competing for a shared resource. It is another objective of the present invention to ensure fairness in granting requests for access.

These and other objectives are now described. According to the present invention, an apparatus for arbitrating between several competing requests that has a number of components cooperate together is disclosed. A number of arbiter cells are provided. These arbiter cells contain a device for shifting a token value, a number of receptors for receiving request signals, and internal circuitry for selecting one of the request signals. The request signal selected by a given arbiter cell depends on the state of the request signals being received by the cell and the position of the cell's token. Also, one or more group arbiters are provided. These group arbiters contain a device for shifting a token value, a number of receptors for receiving request signals, and internal circuitry for selecting an arbiter cell. The arbiter cell eventually selected by a given group arbiter depends on the state of the request signals being received by the arbiter and the position of the arbiter's token. In one mode of operation, each arbiter cell grants a single request signal from the plurality of signals present, and each group arbiter selects a single arbiter cell. This process allows the selection of at least one request signal from the number of request signals originally present.

In one embodiment of the current invention, each arbiter cell receives several request signals. These signals are unique to the given arbiter. Each arbiter cell then grants one of its request signals. At the same time, a single group arbiter selects one of the arbiter cells. The request signal of that selected arbiter cell then becomes the one request for access that is granted. The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
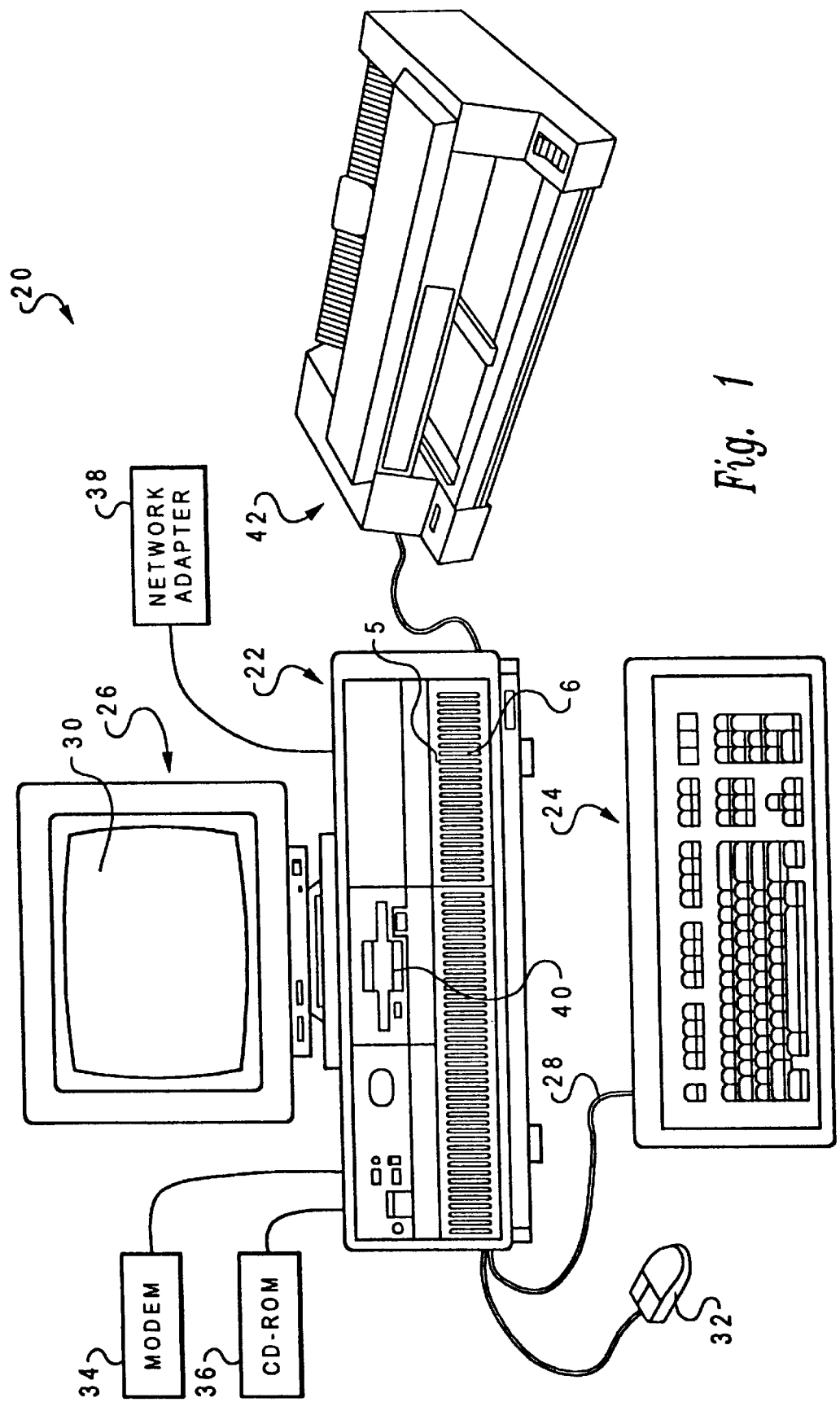
FIG. 1 depicts an example of a data processing system in accordance with the method and system of the present invention.

With reference now to the figures, and in particular to FIG. 1, there is depicted data processing system 20, which contains an implementation of the current invention. Data processing system 20 includes processor 22, keyboard 24, and display 26. Keyboard 24 is coupled to processor 22 by a cable 28. Display 26 includes display screen 30, which may be implemented utilizing a cathode ray tube (CRT), a liquid crystal display (LCD), an electroluminescent panel, or the like. Data processing system 20 also includes pointing device 32, which may be implemented utilizing a track ball, joystick, touch sensitive tablet or screen, trackpad, or as illustrated in FIG. 1, a mouse. Pointing device 32 may be utilized to move a pointer or cursor on display screen 30. Processor 22 may also be coupled to one or more peripheral devices, such as modem 34, CD-ROM 36, network adaptor 38 and floppy disk drive 40, each of which may be internal or external to the enclosure of processor 22. An output device such as printer 42 may also be coupled to processor 22.

Data processing system 20 also contains crossbar switch 5. Further, crossbar switch 5 contains arbiter 6. Arbiter 6 is an implementation of the current invention. Both crossbar switch 5 and arbiter 6 are internal to data processing system 20, and are not shown in FIG. 1.

Those persons skilled in the art of data processing system design should recognize that display 26, keyboard 24, and pointing device 32 may each be implemented utilizing any one of several known off-the-shelf components. Data processing system 20 may be implemented utilizing any general purpose computer or so-called personal computer, such as the personal computer sold under the trademark "PS/2" by International Business Machines Corporation (IBM), of Armonk, N.Y.

Figure 2:
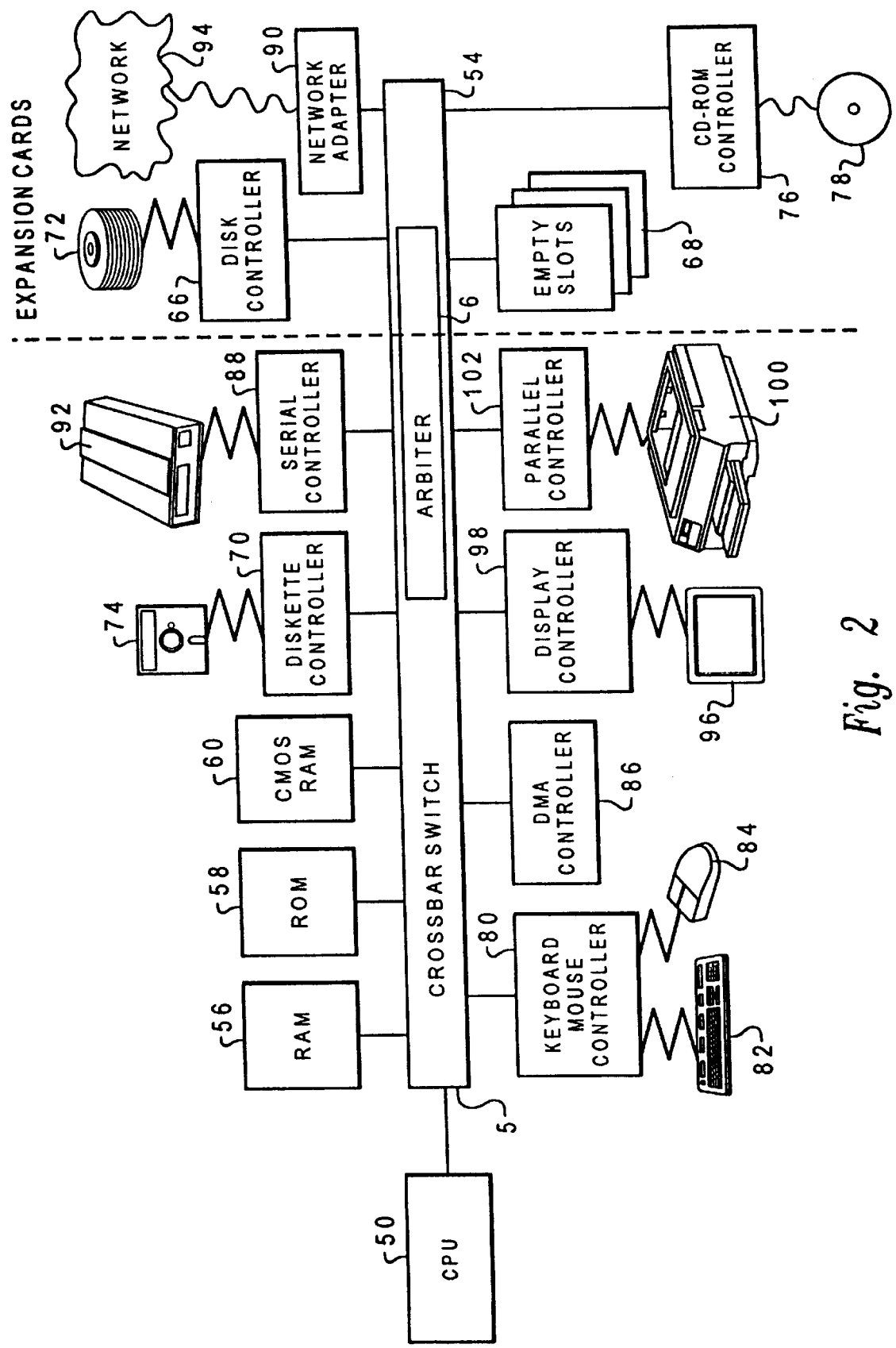
FIG. 2 is a more detailed high-level block diagram further illustrating the major components of the data processing system of FIG. 1 connected to a crossbar switch according to the present invention.

With reference now to FIG. 2, there is depicted a high-level block diagram further illustrating the major components that may be included in data processing system 20 of FIG. 1. Data processing system 20 is controlled primarily by computer readable instructions, which may be in the form of software, wherever, or by whatever means such software is stored or accessed. Such software may be executed within central processing unit (CPU) 50 to cause data processing system 20 to do work. In many known workstations and personal computers, such as the personal computer sold by IBM under the trademark "PS/2," central processing unit 50 is implemented by a single-chip CPU called a microprocessor. Examples of such microprocessors include the microprocessor sold under the trademark "PowerPC" by International Business Machines Corporation and the microprocessor sold under the trademark "PENTIUM" by Intel Corporation.

Memory devices coupled to crossbar switch 5 include random access memory (RAM) 56, read only memory (ROM) 58, and nonvolatile memory 60. Such memories include circuitry that allows information to be stored and retrieved. ROMs contain stored data that cannot be modified. Data stored in RAM can be read or changed by CPU 50 or other hardware devices. Nonvolatile memory is memory that does not lose data when power is removed from it. Nonvolatile memories include ROM, EPROM, flash memory, bubble memory, or battery-backed CMOS RAM. As shown in FIG. 2, such battery-backed CMOS RAM may be utilized to store system configuration information.

An expansion card or expansion board is a circuit board that includes chips and other electronic components connected in a circuit that adds functions or resources to the computer. Typical expansion cards add memory, disk-drive controllers 66, video support, parallel and serial ports, and internal modems. For laptop, palmtop, and other portable computers, expansion cards usually take the form of PC Cards, which are credit card-size devices designed to plug into a slot in the side or back of a computer. An example of such a slot is the PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special-purpose integrated circuits and associated circuitry that direct and control reading from and writing to a hard disk drive 72 and a floppy disk or diskette 74, respectively. Such disk controllers handle tasks such as positioning read/write head, mediating between the drive and the microprocessor, and controlling the transfer of information to and from memory. A single disk controller may be able to control more that one disk drive.

CD-ROM controller 76 may be included in data processing 20 for reading data from CD-ROMs 78 (compact disk read-only memory). Such CD-ROMs use laser optics rather than magnetic means for reading data.

Keyboard mouse controller 80 is provided in data processing system 20 for interfacing with keyboard 82 and a pointing device, such as mouse 84. Such pointing devices are typically utilized to control an on-screen element, such as a cursor, which may take the form of an arrow having a hot spot that specifies the location of the pointer when the user presses a mouse button. Other pointing devices include the graphics tablet, the stylus, the light pen, the joystick, the puck, the trackball, the trackpad and the pointing device sold under the trademark "TrackPoint" by IBM.

Communication between data processing system 20 and other data processing systems may be facilitated by serial controller 88 and network adaptor 90, both of which are coupled to crossbar switch 5. Serial controller 88 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information). Examples of serial communications standards include the RS-232 interface and the RS-422 interface.

As illustrated, such a serial interface may be utilized to communicate with modem 92. A modem is a communications device that enables a computer to transmit information over a standard telephone line. Modems convert digital computer signals to analog signals suitable for communication over telephone lines. Modem 92 may be utilized to connect data processing system 20 to an on-line information service, such as the information service provided under the service mark "PRODIGY" by IBM and Sears. Such on-line service providers may offer software which may be downloaded into data processing system 20 via modem 92. Modem 92 may provide a connection to other sources of software, such as a server, an electronic bulletin board, and the Internet or World Wide Web.

Network adaptor 90 may be used to connect data processing system 20 to a local area network 94. Network 94 may provide computer users with means of communicating and transferring software and information electronically. Additionally, network 94 may provide distributed processing, which involves several computers and the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with a CRT-based video display, an LCD-based flat-panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as a transparency. Other types of printers may include an image setter, a plotter, or a film recorder.

Parallel controller 102 is used to send multiple data and control bits simultaneously over wires connected between crossbar switch 5 and another parallel communication device, such as printer 100. The most common parallel interface is the Centronics interface.

CPU 50 fetches, decodes, and executes instructions, and transfers information to and from other resources via the computer's main data-transfer path, crossbar switch 5. Such a switch connects the components in data processing system 20 and defines the medium for data exchange. Crossbar switch 5 connects together and allows for the exchange of data between memory units 56, 58, and 60, CPU 50 and the other devices as shown in FIG. 2. Internal to crossbar switch 5 is arbiter 6. In this implementation of the present invention, arbiter 6 arbitrates the computing devices' competing request for access to the shared resources attached to crossbar switch 5. For example, CPU 50 and display controller 98 may both wish to access RAM 56 at the same time. Arbiter 6 will then decide whether CPU 50 or display controller 98 can access RAM 56.

It should be noted that the present invention has many applications beside that of a arbitration device inside a crossbar switch. The present invention can be used in any situation where there is a need to have various request for access to a device arbitrated in a timely manner. The above use is but one application of the present invention, and those skilled in the art will appreciate that there are many other situations where an arbitration device can be used.

Figure 3:
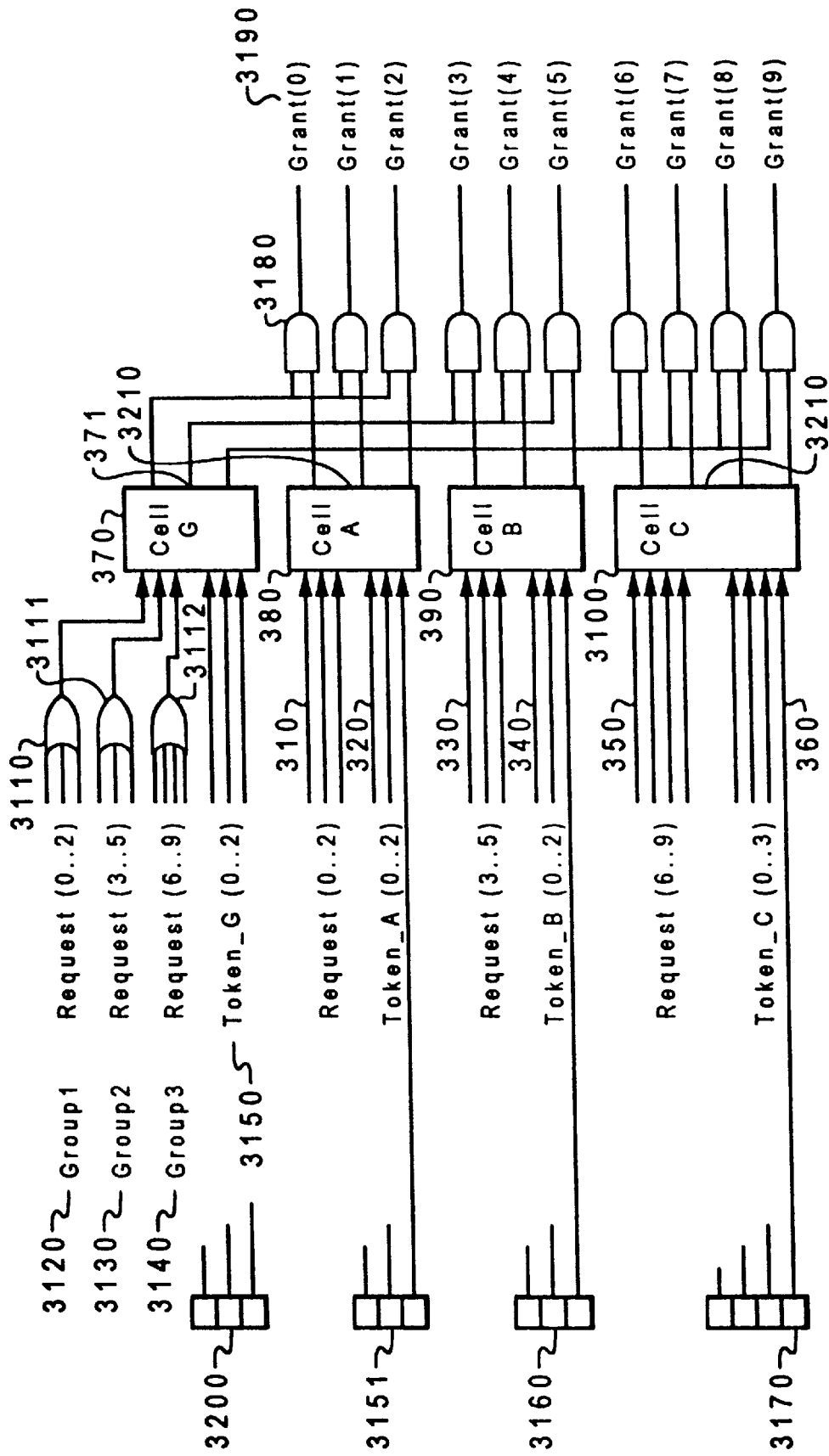
FIG. 3 illustrates a ten request/grant arbiter according to the current invention.

FIG. 3 depicts a broad view of a ten request/grant implementation of the current invention. Request lines 310, 330, and 350 are connected to cells 380, 390, and 3100, respectively. The request lines come from devices wishing to access shared system resources. When a device determines that it needs access, it will assert its request line.

Also connected to cells 380, 390, and 3100 are token lines 320, 340, and 360, respectively. Each token line is associated with a request line. Tokens are used in the present invention to give the cells a standard by which they can decide which device's grant line to assert. These token lines originate from shift registers 3151, 3160, and 3170. Each bit in shift registers 3151, 3160, and 3170 is connected to an individual token line. Shift registers 3151, 3160, and 3170 always have a single bit asserted. The particular bit asserted changes in a manner as will be described below. This shifting of the asserted bit is what ensures that each requesting device will eventually gain access to the shared resource.

An important feature of the current invention is the independence of each cell's token lines. This independence significantly speeds the arbitration process over designs which use a single token. For example, if a request is present, the token line of cell 380 will always be asserted, as will one of the token lines of cell 390 and cell 3100. The token line asserted continually varies, but does so independent of the other cells' token lines. As applied to the current example, prior art designs might have a single, ten bit shift register, where only one bit at a time would be asserted.

In addition to cells 380, 390, and 3100, there is group cell 370. Group cell 370 contains internal circuitry that is very similar to cells 380, 390, and 3100. The difference between group cell 370 and cells 380, 390, and 3100 is the inputs that group cell 370 receives. Whereas cells 380, 390, and 3100 receive as inputs request lines from various computing devices, group cell 370 receives the output of OR gates 3110, 3111 and 3112. OR gates 3110, 3111, 3112 have as inputs the request lines that are connected to cells 380, 390, and 3100. Thus, the three individual request lines that comprise request lines 310 are input to OR gate 3110, the three individual request lines that comprise request lines 330 are input to OR gate 3111, and the four individual request lines that comprise request lines 350 are input to OR gate 3112. As stated above, the outputs of these OR gates are used as inputs by group cell 370. These inputs allow group cell 370 to arbitrate effectively between cells 380, 390, and 3100, much like cells 380, 390, and 3100 arbitrate between the request lines to which they are connected.

Again, in a manner very similar to cells 380, 390, and 3100, group cell 370 has as inputs token lines 3150. These token lines originate from shift register 3200. Shift register 3200 always has a single bit asserted. As with the other cells, the tokens used by group cell 370 are not shared by any other cell.

Cells 380, 390, and 3100 and group cell 370 contain the internal circuitry that compares the request lines that are asserted and the position of the active token. After comparing these various inputs, a cell then asserts one of its output lines 3210, or, in the case of group cell 370, output lines 371. The output lines of cells 380, 390, and 3100 are then sent through AND gates 3180 together with the output lines of group cell 370. The outputs of these AND gates become grant lines 3190. These grant lines are the final product of the arbitration process. Each request line coming into the arbitration unit has a corresponding grant line, and only one grant line will be asserted during a given cycle. The grant line that is asserted will communicate to the requesting device that it now has permission to access the shared system resource.

As stated above, the shift registers that are used to implement the token scheme in the present invention are continually shifting. The asserted bit of shift register 3200 shifts when any of grant lines 3190 become asserted. As for cells 380, 390, and 3100, the asserted bit in the particular cell's shift register shifts when one of the grant lines that corresponds to a cell's request lines becomes asserted. For example, the asserted bit in shift register 3170 shifts when either Grant(6), Grant(7), Grant(8), or Grant(9) becomes asserted. Likewise, the asserted bit in shift register 3160 will shifts when either Grant(3), Grant(4), or Grant(5) becomes asserted. Shift register 3151 shifts in the same manner.

This type of shifting provides a means of preventing head-of-line blocking. As an example, given that shift registers 3200, 3151, 3160, and 3170 are initialized with bit 0 asserted, and that Request(0) through Request(9) are all asserted at all times, the grant sequence would be: Grant(0), Grant(3), Grant(6), Grant(1), Grant(4), Grant(7), Grant(2), Grant(5), Grant(8), Grant(0), Grant(3), and Grant(9).

Figure 4:
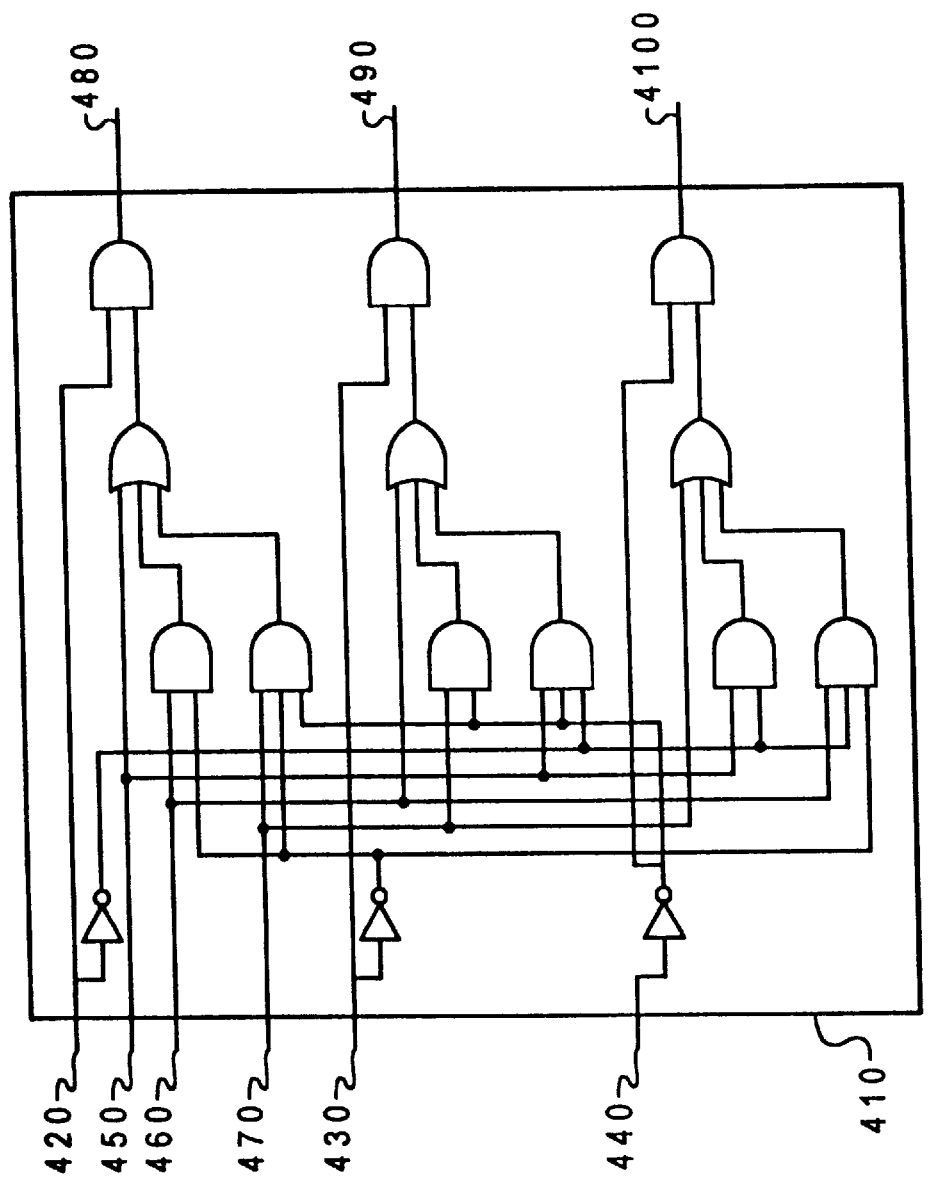
FIG. 4 illustrates the internal logic of one of the cells depicted in FIG. 3.

With reference now to FIG. 4, there is depicted the internal circuitry of group cell 370, cell 380 and cell 390, as they are shown in FIG. 3. Cell 3100 has four inputs, so its internal circuitry would be slightly different than what is shown in FIG. 4. As inputs, generic cell 410 in FIG. 4 has three request lines 420, 430, and 440, and three token lines 450, 460, and 470. Any number of request lines may be asserted during a given cycle; however, one and only one token line will ever be asserted at a time. As outputs, there are three grant lines, 480, 490, and 4100. Only one grant line at a time can be asserted. The grant line so asserted depends on which request lines are asserted and which token line is active.

Shown below are the equations for group cell 370, cell 380 and cell 390, as illustrated in FIG. 3:

$$grant_{480}=req_{420} \ \& \ (token_{450}+(token_{480} \ \& \ \overline{req_{430}})+(token_{470} \ \& \ \overline{req_{440}} \ \& \ \overline{req_{430}}))$$

$$grant_{490}=req_{430} \ \& \ (token_{480}+(token_{470} \ \& \ \overline{req_{440}})+(token_{450} \ \& \ \overline{req_{420}} \ \& \ \overline{req_{440}}))$$

$$grant_{4100}=req_{440} \ \& \ (token_{470}+(token_{450} \ \& \ \overline{req_{420}})+(token_{480} \ \& \ \overline{req_{430}} \ \& \ \overline{req_{420}}))$$

As for cell 3100, as illustrated in FIG. 3, its equations are:

$$sub\_grantC0=req6 \ \& \ (tokenC0+(tokenC1 \ \& \ \overline{req7})+(tokenC2 \ \& \ \overline{req8} \ \& \ \overline{req7}))+(tokenC3 \ \& \ \overline{req9} \ \& \ \overline{req7} \ \& \ \overline{req8}))$$

$$sub\_grantC1=req7 \ \& \ (tokenC1+(tokenC2 \ \& \ \overline{req8})+(tokenC3 \ \& \ \overline{req9} \ \& \ \overline{req8}))+(tokenC0 \ \& \ \overline{req6} \ \& \ \overline{req8} \ \& \ \overline{req9}))$$

$$sub\_grantC2=req8 \ \& \ (tokenC2+(tokenC3 \ \& \ \overline{req9})+(tokenC0 \ \&$$

$\overline{req6}$ & $\overline{req9}$))+(tokenC1 & $\overline{req7}$ & $\overline{req9}$ & $\overline{req6}$))

sub_grantC3=req9 & (tokenC3+(tokenC0 & $\overline{req6}$)+(tokenC1 & $\overline{req7}$ & $\overline{req6}$))+(tokenC2 & $\overline{req8}$ & $\overline{req6}$ & $\overline{req7}$))

The invention as shown in FIG. 3 is comprised of 10 request/grant lines. The present invention, however, can be used to arbitrate between any number of requests. In general, to determine the number of cells needed to implement the current invention, one can take the square root of the total number of requests as the approximate number of cells that will optimally implement the current invention. From there each cell will contain as request inputs approximately the square root of the total number of requests.

For example, in a system having 100 request lines that need to be arbitrated, there would be 10 cells, each having 10 request lines as inputs. Also, there would need to be 10 independent token shifting devices, which could be implemented as shift registers. Finally, there would need to be a single group cell. This group cell would have as inputs the output of 10 OR gates and 10 token lines. The general goal is to spread the task of arbitration as evenly as possible, so that there is no portion of the system that has propagation delays that are larger than all the rest.

As for implementing the present invention with an uneven number of request, such as the case in FIG. 3 which has 10 request, extra request lines can be routed to a given cell. For example, cell 3100 in FIG. 3, where there is shown 10 request lines, additional request lines, while cells 380 and 390 only have three.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

I claim:

1. An arbiter apparatus, comprising:
   a. a plurality of arbiter cells, each of said plurality of arbiter cells further comprising:
      i. a cell token device which changes state when the arbiter cells associated therewith is selected by a group arbiter;
      ii. a reception means for receiving a plurality of request signals, wherein each of said plurality of request signals is unique to a particular arbiter cell;
      iii. a means for granting a request signal within said plurality of request signals in response to the state of said cell token device and said plurality of request signals;
   b. one or more group arbiters, each of said one or more group arbiters further comprising:
      i. a group token device which changes state when an associated group arbiter selects an arbiter cell;
      ii. a reception means for receiving a plurality of request signals; and
      iii. a means for selecting an arbiter cell within said plurality of arbiter cells in response to the state of said group token device and said plurality of request signals.

2. The apparatus as recited in claim 1 wherein said group token device and said cell token device are shift registers.

3. The apparatus as recited in claim 1 wherein:
   a. each of said plurality of arbiter cells is further comprised of a cell output that communicates which request signal within said plurality of request signals was granted; and
   b. each of said one or more group arbiters is further comprised of a group output that communicates which arbiter cell within said plurality of arbiter cells has been selected.

4. The apparatus as recited in claim 3 wherein said means for selecting an arbiter cell within said plurality of arbiter cells in response to the state of said group token device and said plurality of request signals is comprised of a plurality of AND gates which each having as inputs:
   a. said cell outputs of said plurality of said arbiter cells; and
   b. said group outputs of said at least one said group arbiter.

5. The apparatus as recited in claim 3 wherein the length of time between the reception of said plurality of request signal by an arbiter cell within said plurality of arbiter cells and the communication of which request signal within said plurality of request signals was granted by said arbiter cell is substantially equivalent for each of said plurality of said arbiter cells.

6. The apparatus as recited in claim 3 wherein the time between the reception of said plurality of request signals by a group arbiter within said one or more group arbiters and the communication of which of arbiter cell within said plurality of arbiter cells has been selected by said group arbiter is substantially equivalent the length of time between the reception of said plurality of request signals by an arbiter cell within said plurality of arbiter cells and the communication of which request signal within said plurality of request signals was granted said arbiter cell.

7. The apparatus as recited in claim 1 wherein said plurality of request signals are received and processed concurrently by said plurality of arbiter cells.

8. A method of arbitrating between a plurality of request signals comprising:
   a. providing a plurality of arbiter cells, each of said plurality of arbiter cells having a cell token device and a reception means for receiving a plurality of request signals, from said plurality of arbiter cells wherein each of said plurality of request signals is unique to a particular arbiter cell;
   b. providing one or more group arbiters, each of said one or more group arbiters having a group token device and a reception means for receiving a plurality of request signals;
   c. utilizing each of said plurality of arbiter cells to select a request signal within said plurality of request signals received, in response to the state of said cell token device and said plurality of request signals;
   d. utilizing said one or more group arbiters to select a particular said arbiter cell in response to the state of said group token device and said plurality of request signals.

9. The method as recited in claim 8 wherein:
   a. changing the state of a selected group token device within said one or more group token devices upon selecting an arbiter cell; and
   b. changing the state of a selected cell token device within said plurality of said cell token devices upon said selected cell token device being selected by a group arbiter.

10. A method as recited in claim 8 wherein said group token device and said cell token device are shift registers.

11. A method as recited in claim 8 wherein the step of utilizing each of said plurality of arbiter cells to select a request signal within said plurality of request signals in response to the state of said token device and said plurality of request signals occurs simultaneously with the step of utilizing said one or more group arbiters to select a particular said arbiter cell in response to the state of said group token device and said plurality of request signals.

12. The method as recited in claim 8 wherein:
   a. each of said plurality of arbiter cells is further comprised of a cell output that communicates which request signal within said plurality of request signals was granted; and
   b. each of said one or more group arbiters is further comprised of a group output that communicates which arbiter cell within said plurality of arbiter cells has been selected.

13. The method as recited in claim 12 further comprised:
   a. utilizing said plurality of cell outputs to communicate which request signals within said plurality of request signals were granted; while at substantially the same time,
   b. utilizing said one or more of group outputs to communicate which arbiter cells within said plurality of arbiter cells were selected.

14. The method as recited in claim 13 further comprised:
   a. changing the state of a group token device within said plurality of group token devices when the group arbiter which said group token device comprises selects an arbiter cell; and
   b. changing the state of a cell token device within said plurality of cell token devices when the arbiter cell which said cell token device comprises grants a request signal.

15. A method of arbitrating between a plurality of request signals comprising:
   a. receiving a plurality of request signals from a plurality of requesting devices at a plurality of arbiter cells;
   b. selecting a request signal from said plurality of request signals in response to the state of a cell token device and the request lines received by each of said plurality of arbiter cells, one selection for each of said plurality of arbiter cells,;
   c. receiving a plurality of request signals at one or more group arbiters;
   d. selecting a particular arbiter cell within said plurality of arbiter cells in response to the state of a group token device and the requests received by each of said one or more group arbiters, one selection for each of said one or more group arbiters; and
   e. communicating the selected request signals of said particular arbiter cells wherein said selected request signals become grant signals that are communicated to said requesting devices.

\* \* \* \* \*